United States Patent
Choe et al.

(10) Patent No.: US 11,810,006 B2
(45) Date of Patent: Nov. 7, 2023

(54) SYSTEM FOR EXTENDING FUNCTIONALITY OF HYPOTHESES GENERATED BY SYMBOLIC/LOGIC-BASED REASONING SYSTEMS

(71) Applicant: GM Global Technology Operations LLC, Detroit, MI (US)

(72) Inventors: Jaehoon Choe, Agoura Hills, CA (US); Rajan Bhattacharyya, Sherman Oaks, CA (US); Kyungnam Kim, Oak Park, CA (US); Kenji Yamada, Los Angeles, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 346 days.

(21) Appl. No.: 16/951,459

(22) Filed: Nov. 18, 2020

(65) Prior Publication Data
US 2022/0156605 A1    May 19, 2022

(51) Int. Cl.
| | |
|---|---|
| *G06N 5/04* | (2023.01) |
| *B60W 60/00* | (2020.01) |
| *G06V 20/58* | (2022.01) |
| *B60W 30/095* | (2012.01) |
| *G06N 5/045* | (2023.01) |

(52) U.S. Cl.
CPC ............ *G06N 5/04* (2013.01); *B60W 60/001* (2020.02); *B60W 60/0011* (2020.02); *B60W 60/00272* (2020.02); *B60W 60/00276* (2020.02); *G06V 20/58* (2022.01); *B60W 30/0956* (2013.01); *B60W 60/0027* (2020.02); *B60W 2556/10* (2020.02); *G06N 5/045* (2013.01)

(58) Field of Classification Search
None
See application file for complete search history.

(56) References Cited

U.S. PATENT DOCUMENTS

| | | | | |
|---|---|---|---|---|
| 11,377,120 B1* | 7/2022 | Deng | ............... | B60W 30/0956 |
| 2014/0129504 A1* | 5/2014 | Soon-Shiong | ......... | G06N 5/022 |
| | | | | 706/47 |
| 2019/0108753 A1* | 4/2019 | Kaiser | .................. | G08G 1/0141 |
| 2020/0255027 A1* | 8/2020 | Kulkarni | ............ | G01C 21/3602 |
| 2020/0283030 A1* | 9/2020 | Raichelgauz | .......... | G08G 1/166 |

(Continued)

OTHER PUBLICATIONS

Baker, et al., "Traffic interaction in the urban challenge: Putting boss on its best behavior," 2008 IEEE/RSJ International Conference on Intelligent Robots and Systems, Nice, 2008, pp. 1752-1758, doi: 10.1109/IROS.2008.4651211.

(Continued)

*Primary Examiner* — Christian Chace
*Assistant Examiner* — Shayne M. Gilbertson
(74) *Attorney, Agent, or Firm* — CANTOR COLBURN LLP

(57) ABSTRACT

A vehicle and a system and a method of operating the vehicle. The system includes a reasoning engine, an episodic memory, a resolver and a controller. The reasoning engine infers a plurality of possible scenarios based on a current state of an environment of the vehicle. The episodic memory determines a historical likelihood for each of the plurality of possible scenarios. The resolver selects a scenario from the plurality of possible scenarios using the historical likelihoods. The controller operates the vehicle based on the selected scenario.

14 Claims, 9 Drawing Sheets

(56) References Cited

U.S. PATENT DOCUMENTS

2021/0261123 A1* 8/2021 Wray ............... B60W 30/0956
2022/0017122 A1* 1/2022 Malla .................... G06N 3/049

OTHER PUBLICATIONS

Colreg, "Convention on the International Regulations for Preventing Collisions at Sea, 1972 (COLREGs)", Accessed Online: Nov. 17, 2020, 4 Pages. URL: https://www.imo.org/en/About/Conventions/Pages/COLREG.aspx.

Gu, et al., "On-Road Trajectory Planning for General Autonomous Driving with Enhanced Tunability", Proceedings of the 13th International Conference on Intelligent Autonomous Systems (IAS-13), Jul. 2014, 13 Pages.

Lightweight Communications and Marshalling (LCm), Accessed Online: Nov. 17, 2020, 3 Pages.URL: https://lcm-proj.github.io/.

Wikipedia, Expert Systems, Accessed Online: Nov. 17, 2020, 8 Pages. URL: https://en.wikipedia.org/wiki/Expert_system.

Fisher; "Practical Formal Methods Using Temporal Logic"; John Wiley & Sons, Ltd.; 2011; 94 Pages.

McCarthy; "Some Expert System Need Common Sense"; Computer Science Department; Stanford University; 1984; 11 Pages.

Reece et al.; "A Computational Model of Driving for Autonomous Vehicles"; School of Computer Science; Carnegie Mellon University; CMU-CS-91-122; Apr. 1991; 45 Pages.

Rodrigues et al. .; "Peirce: An Algorithm for Abductive Reasoning Operating with a Quaternary Reasoning Framework"; Research in Computing Science; vol. 82; 2014; pp. 53-66.

Shalev-Shwartz et al.; "Safe, Multi-Agent, Reinforcement Learning for Autonomous Driving"; Retrieved Online from arXiv:1610.03295v1 [cs.AI]; Oct. 11, 2016; 13 Pages.

Wei et al.; "A Behavioral Planning Framework for Autonomous Driving"; IEEE Intelligent Vehicles Symposium (IV); 2014; 7 Pages.

* cited by examiner

SYSTEM FOR EXTENDING FUNCTIONALITY OF HYPOTHESES GENERATED BY SYMBOLIC/LOGIC-BASED REASONING SYSTEMS

INTRODUCTION

The subject disclosure relates to a system and method for operating an autonomous vehicle and, in particular, a system and method for selecting an action for the autonomous vehicle to generate possible scenarios based on current traffic conditions and evaluate a likelihood of each scenario.

A cognitive processor can be used with an autonomous vehicle in order to predict traffic patterns and/or conditions and to propose trajectories to the autonomous vehicle. The cognitive processor can arrive at a trajectory using various decision processes, including physics-based or kinematic calculations, statistical predictions, pattern recognition and symbolic or logic-based reasoning, for example. Current technologies that drive symbolic or logic-based reasoning systems sacrifice versatility when processing information. Logical reasoning generates binary hypotheses that do not always reflect real-time traffic situations and are inflexible toward new or unexpected conditions as well as to incomplete information of the environment. However, the existence of independent agents in the vehicle's environment causes unexpected events and can present conflicting data, all of which slows down or stalls the logic-based reasoning system. Accordingly, it is desirable to provide a method for refining or augmenting the results of a logic-based reasoning to operating with incomplete information of the environment.

SUMMARY

In one exemplary embodiment, a method of operating an autonomous vehicle is disclosed. A plurality of possible scenarios is inferred based on a current state of an environment of the autonomous vehicle. A historical likelihood is determined for each of the plurality of possible scenarios. A scenario is selected from the plurality of possible scenarios using the historical likelihoods. The autonomous vehicle is operated based on the selected scenario.

In addition to one or more of the features described herein, a logic-based likelihood is determined for each of the plurality of possible scenarios, and the scenario is selected from the plurality of possible scenarios based on the historical likelihoods and the logic-based likelihoods. The method further includes tokenizing a scenario and determining the historical likelihood for the scenario using the tokenized scenario. The historical likelihood for a tokenized scenario is determined by determining a similarity of the tokenized scenario to one or more historical events in a database and determining a prevalence of the one or more historical events in the database. The method further includes determining a similarity percentage for the tokenized scenario based on a similarity metric between the tokenized scenario and the one or more historical events. The method further includes inferring the plurality of possible scenarios based on incomplete or ambiguous measurements. Inferring the plurality of possible scenarios further includes applying to one of abduction, deduction and a combination of abduction and deduction to data indicative of the current state of the environment.

In another exemplary embodiment, a system for operating an autonomous vehicle is disclosed. The system includes a reasoning engine, an episodic memory, a resolver and a controller. The reasoning engine infers a plurality of possible scenarios based on a current state of an environment of the autonomous vehicle. The episodic memory determines a historical likelihood for each of the plurality of possible scenarios. The resolver selects a scenario from the plurality of possible scenarios using the historical likelihoods. The controller operates the autonomous vehicle based on the selected scenario.

In addition to one or more of the features described herein, the system further includes an Inference Evaluation Engine configured to determine a logic-based likelihood for each of the plurality of possible scenarios at, wherein the Inference Evaluation Engine selects the scenario from the plurality of possible scenarios based on the historical likelihoods and the logic-based likelihoods. The Inference Evaluation Engine tokenizes a scenario and the episodic memory determines the historical likelihood for the scenario using the tokenized scenario. The episodic memory determines the historical likelihood for a tokenized scenario by determining a similarity of the tokenized scenario to one or more historical events in a database and determining a prevalence of the one or more historical events in the database. The episodic memory determines a similarity percentage for the tokenized scenario based on a similarity metric between the tokenized scenario and the one or more historical events. The reasoning engine infers the plurality of possible scenarios based on incomplete or ambiguous measurements. The reasoning engine infers the plurality of possible scenarios by applying one of abduction, deduction and a combination of abduction and deduction to data indicative of the current state of the environment.

In yet another exemplary embodiment, an autonomous vehicle is disclosed. The autonomous vehicle includes a reasoning engine, an episodic memory, a resolver and a controller. The reasoning engine infers a plurality of possible scenarios based on a current state of an environment of the autonomous vehicle. The episodic memory determines a historical likelihood for each of the plurality of possible scenarios. The resolver selects a scenario from the plurality of possible scenarios using the historical likelihoods. The controller operates the autonomous vehicle based on the selected scenario.

In addition to one or more of the features described herein, the vehicle further includes an Inference Evaluation Engine configured to determine a logic-based likelihood for each of the plurality of possible scenarios at, wherein the Inference Evaluation Engine selects the scenario from the plurality of possible scenarios based on the historical likelihoods and the logic-based likelihoods. The Inference Evaluation Engine tokenizes a scenario and the episodic memory determines the historical likelihood for the scenario using the tokenized scenario. The episodic memory determines the historical likelihood for a tokenized scenario by determining a similarity of the tokenized scenario to one or more historical events in a database and determining a prevalence of the one or more historical events in the database. The episodic memory determines a similarity percentage for the tokenized scenario based on a similarity metric between the tokenized scenario and the one or more historical events. The reasoning engine infers a possible scenario by applying one of abduction, deduction and a combination of abduction and deduction to data indicative of the current state of the environment.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
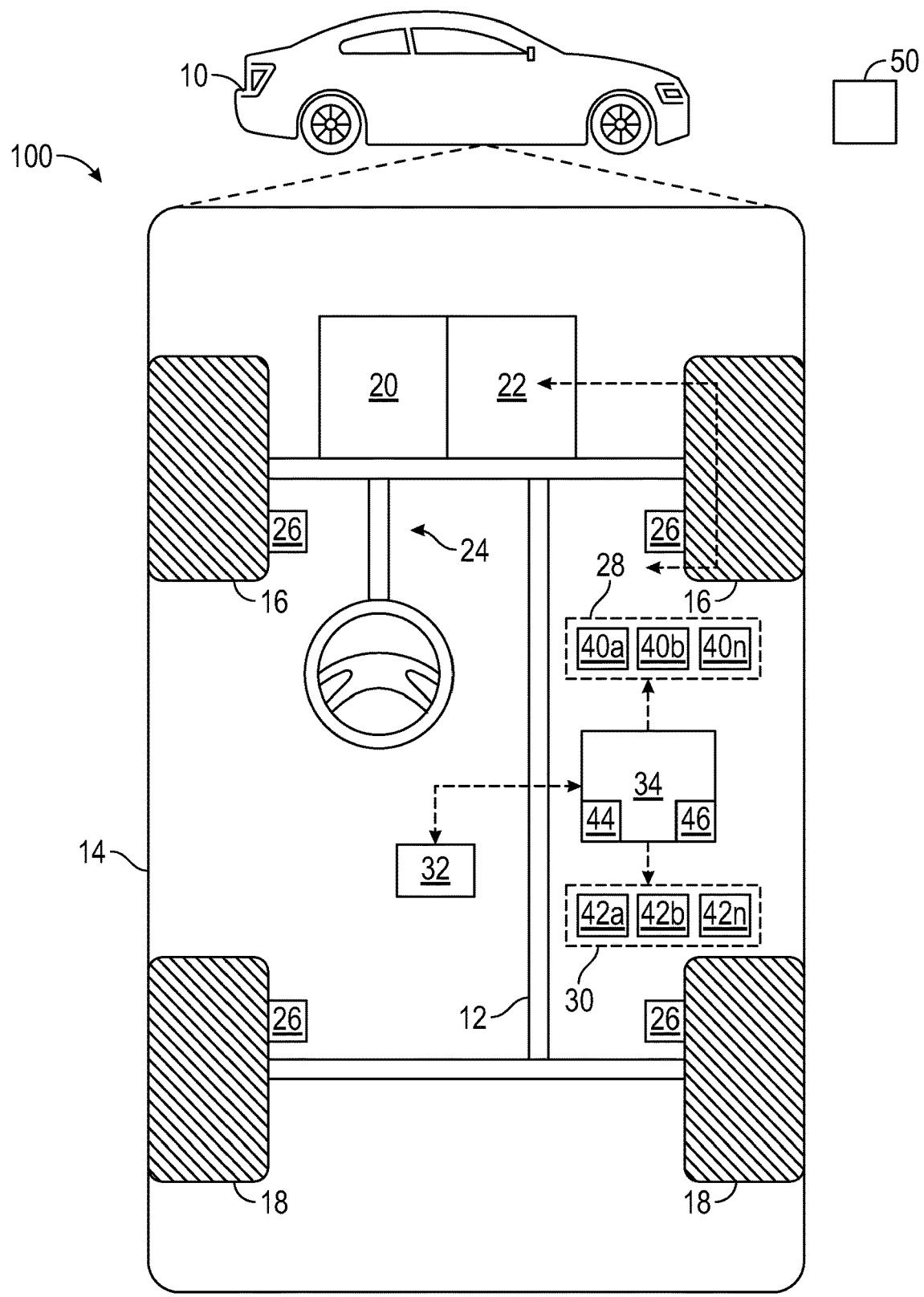
FIG. 1 shows an autonomous vehicle with an associated trajectory planning system in accordance with various embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an autonomous vehicle 10 with an associated trajectory planning system depicted at 100 in accordance with various embodiments. In general, the trajectory planning system 100 determines a trajectory plan for automated driving of the autonomous vehicle 10. The autonomous vehicle 10 generally includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The wheels 16 and 18 are each rotationally coupled to the chassis 12 near respective corners of the body 14.

In various embodiments, the trajectory planning system 100 is incorporated into the autonomous vehicle 10. The autonomous vehicle 10 is, for example, a vehicle that is automatically controlled to carry passengers from one location to another. The autonomous vehicle 10 is depicted in the illustrated embodiment as a passenger vehicle, but it should be appreciated that any other vehicle including motorcycles, trucks, sport utility vehicles (SUVs), recreational vehicles (RVs), etc., can also be used. At various levels, an autonomous vehicle can assist the driver through a number of methods, such as warning signals to indicate upcoming risky situations, indicators to augment situational awareness of the driver by predicting movement of other agents warning of potential collisions, etc. The autonomous vehicle has different levels of intervention or control of the vehicle through coupled assistive vehicle control all the way to full control of all vehicle functions. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, a cognitive processor 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The sensing devices 40a-40n obtain measurements or data related to various objects or agents 50 within the vehicle's environment. Such agents 50 can be, but are not limited to, other vehicles, pedestrians, bicycles, motorcycles, etc., as well as non-moving objects. The sensing devices 40a-40n can also obtain traffic data, such as information regarding traffic signals and signs, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling, navigating and operating the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms.

The controller 34 is further in communication with the cognitive processor 32. The cognitive processor 32 receives various data from the controller 34 and from the sensing devices 40a-40n of the sensor system 28 and performs various calculations in order to provide a trajectory to the controller 34 for the controller 34 to implement at the autonomous vehicle 10 via the one or more actuator devices 42a-42n. A detailed discussion of the cognitive processor 32 is provided with respect to FIG. 2.

Figure 2:
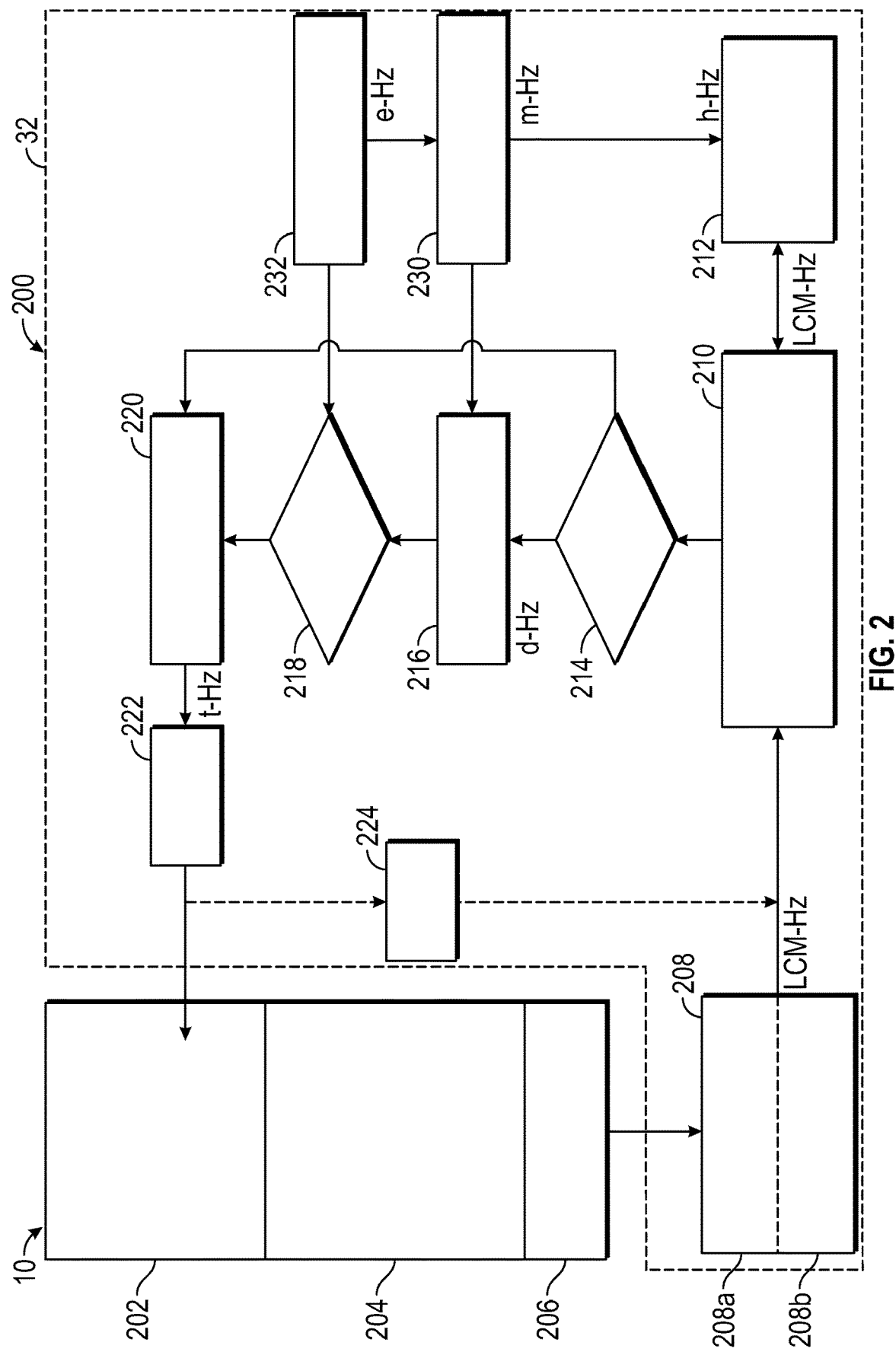
FIG. 2 shows an illustrative control system including a cognitive processor integrated with an autonomous vehicle.

FIG. 2 shows an illustrative control system 200 including a cognitive processor 32 integrated with an autonomous vehicle 10. In various embodiments, the autonomous vehicle 10 can be a vehicle simulator that simulates various driving scenarios for the autonomous vehicle 10 and simulates various responses of the autonomous vehicle 10 to the scenarios.

The autonomous vehicle 10 includes a data acquisition system 204 (e.g., sensors 40a-40n of FIG. 1). The data acquisition system 204 obtains various data for determining a state of the autonomous vehicle 10 and various agents in the environment of the autonomous vehicle 10. Such data includes, but is not limited to, kinematic data, position or pose data, etc., of the autonomous vehicle 10 as well as data about other agents, including as range, relative speed (Doppler), elevation, angular location, etc. The autonomous vehicle 10 further includes a sending module 206 that packages the acquired data and sends the packaged data to the communication interface 208 of the cognitive processor 32, as discussed below. The autonomous vehicle 10 further includes a receiving module 202 that receives operating commands from the cognitive processor 32 and performs the commands at the autonomous vehicle 10 to navigate the autonomous vehicle 10. The cognitive processor 32 receives the data from the autonomous vehicle 10, computes a trajectory for the autonomous vehicle 10 based on the provided state information and the methods disclosed herein and provides the trajectory to the autonomous vehicle 10 at the receiving module 202. The autonomous vehicle 10 then implements the trajectory provided by the cognitive processor 32.

The cognitive processor 32 includes various modules for communication with the autonomous vehicle 10, including the interface module 208 for receiving data from the autonomous vehicle 10 and a trajectory sender 222 for sending instructions, such as a trajectory to the autonomous vehicle 10. The cognitive processor 32 further includes a working memory 210 that stores various data received from the autonomous vehicle 10 as well as various intermediate calculations of the cognitive processor 32. A hypothesizer module(s) 212 of the cognitive processor 32 is used to propose various hypothetical trajectories and motions of one or more agents in the environment of the autonomous vehicle 10 using a plurality of possible prediction methods and state data stored in working memory 210. A hypothesis resolver 214 of the cognitive processor 32 receives the plurality of hypothetical trajectories for each agent in the environment and determines a most likely trajectory for each agent from the plurality of hypothetical trajectories.

The cognitive processor 32 further includes one or more decider modules 216 and a decision resolver 218. The decider module(s) 216 receives the most likely trajectory for each agent in the environment from the hypothesis resolver 214 and calculates a plurality of candidate trajectories and behaviors for the autonomous vehicle 10 based on the most likely agent trajectories. Each of the plurality of candidate trajectories and behaviors is provided to the decision resolver 218. The decision resolver 218 selects or determines an optimal or desired trajectory and behavior for the autonomous vehicle 10 from the candidate trajectories and behaviors.

The cognitive processor 32 further includes a trajectory planner 220 that determines an autonomous vehicle trajectory that is provided to the autonomous vehicle 10. The trajectory planner 220 receives the vehicle behavior and trajectory from the decision resolver 218, an optimal hypothesis for each agent 50 from the hypothesis resolver 214, and the most recent environmental information in the form of "state data" to adjust the trajectory plan. This additional step at the trajectory planner 220 ensures that any anomalous processing delays in the asynchronous computation of agent hypotheses is checked against the most recent sensed data from the data acquisition system 204. This additional step updates the optimal hypothesis accordingly in the final trajectory computation in the trajectory planner 220.

The determined vehicle trajectory is provided from the trajectory planner 220 to the trajectory sender 222 which provides a trajectory message to the autonomous vehicle 10 (e.g., at controller 34) for implementation at the autonomous vehicle 10.

The cognitive processor 32 further includes a modulator 230 that controls various limits and thresholds for the hypothesizer module(s) 212 and decider module(s) 216. The modulator 230 can also apply changes to parameters for the hypothesis resolver 214 to affect how it selects the optimal hypothesis object for a given agent 50, deciders, and the decision resolver. The modulator 230 is a discriminator that makes the architecture adaptive. The modulator 230 can change the calculations that are performed as well as the actual result of deterministic computations by changing parameters in the algorithms themselves.

An evaluator module 232 of the cognitive processor 32 computes and provides contextual information to the cognitive processor including error measures, hypothesis confidence measures, measures on the complexity of the environment and autonomous vehicle 10 state, performance evaluation of the autonomous vehicle 10 given environmental information including agent hypotheses and autonomous vehicle trajectory (either historical, or future). The modulator 230 receives information from the evaluator 232 to compute changes to processing parameters for hypothesizers 212, the hypothesis resolver 214, the deciders 216, and threshold decision resolution parameters to the decision resolver 218. A virtual controller 224 implements the trajectory message and determines a feedforward trajectory of various agents 50 in response to the trajectory.

Modulation occurs as a response to uncertainty as measured by the evaluator module 232. In one embodiment, the modulator 230 receives confidence levels associated with hypothesis objects. These confidence levels can be collected from hypothesis objects at a single point in time or over a selected time window. The time window may be variable. The evaluator module 232 determines the entropy of the distribution of these confidence levels. In addition, historical error measures on hypothesis objects can also be collected and evaluated in the evaluator module 232.

These types of evaluations serve as an internal context and measure of uncertainty for the cognitive processor 32. These contextual signals from the evaluator module 232 are utilized for the hypothesis resolver 214, decision resolver, 218, and modulator 230 which can change parameters for hypothesizer modules 212 based on the results of the calculations.

The various modules of the cognitive processor 32 operate independently of each other and are updated at individual update rates (indicated by, for example, LCM-Hz, h-Hz, d-Hz, e-Hz, m-Hz, t-Hz in FIG. 2).

In operation, the interface module 208 of the cognitive processor 32 receives the packaged data from the sending module 206 of the autonomous vehicle 10 at a data receiver 208a and parses the received data at a data parser 208b. The data parser 208b places the data into a data format, referred to herein as a property bag, that can be stored in working memory 210 and used by the various hypothesizer modules 212, decider modules 216, etc. of the cognitive processor 32. The particular class structure of these data formats should not be considered a limitation of the invention.

Working memory 210 extracts the information from the collection of property bags during a configurable time window to construct snapshots of the autonomous vehicle and various agents. These snapshots are published with a fixed frequency and pushed to subscribing modules. The data structure created by working memory 210 from the property bags is a "State" data structure which contains information organized according to timestamp. A sequence of generated snapshots therefore encompasses dynamic state information for another vehicle or agent. Property bags within a selected State data structure contain information about objects, such as other agents, the autonomous vehicle, route information, etc. The property bag for an object contains detailed information about the object, such as the object's location, speed, heading angle, etc. This state data structure flows throughout the rest of the cognitive processor 32 for computations. State data can refer to autonomous vehicle states as well as agent states, etc.

The hypothesizer module(s) 212 pulls State data from the working memory 210 in order to compute possible outcomes of the agents in the local environment over a selected time frame or time step. Alternatively, the working memory 210 can push State data to the hypothesizer module(s) 212. The hypothesizer module(s) 212 can include a plurality of hypothesizer modules, with each of the plurality of hypothesizer modules employing a different method or technique for determining the possible outcome of the agent(s). One hypothesizer module may determine a possible outcome using a kinematic model that applies basic physics and mechanics to data in the working memory 210 in order to predict a subsequent state of each agent 50. Other hypothesizer modules may predict a subsequent state of each agent 50 by, for example, employing a kinematic regression tree to the data, applying a Gaussian Mixture Model/Markovian mixture model (GMM-HMM) to the data, applying a recursive neural network (RNN) to the data, other machine learning processes, performing logic based reasoning on the data, etc. The hypothesizer modules 212 are modular components of the cognitive processor 32 and can be added or removed from the cognitive processor 32 as desired.

Each hypothesizer module 212 includes a hypothesis class for predicting agent behavior. The hypothesis class includes specifications for hypothesis objects and a set of algorithms. Once called, a hypothesis object is created for an agent from the hypothesis class. The hypothesis object adheres to the specifications of the hypothesis class and uses the algorithms of the hypothesis class. A plurality of hypothesis objects can be run in parallel with each other. Each hypothesizer module 212 creates its own prediction for each agent 50 based on the working current data and sends the prediction back to the working memory 210 for storage and for future use. As new data is provided to the working memory 210, each hypothesizer module 212 updates its hypothesis and pushes the updated hypothesis back into the working memory 210. Each hypothesizer module 212 can choose to update its hypothesis at its own update rate (e.g., rate h-Hz). Each hypothesizer module 212 can individually act as a subscription service from which its updated hypothesis is pushed to relevant modules.

Each hypothesis object produced by a hypothesizer module 212 is a prediction in the form of a state data structure for a vector of time, for defined entities such as a location, speed, heading, etc. In one embodiment, the hypothesizer module(s) 212 can contain a collision detection module which can alter the feedforward flow of information related to predictions. Specifically, if a hypothesizer module 212 predicts a collision of two agents 50, another hypothesizer module may be invoked to produce adjustments to the hypothesis object in order to take into account the expected collision or to send a warning flag to other modules to attempt to mitigate the dangerous scenario or alter behavior to avoid the dangerous scenario.

For each agent 50, the hypothesis resolver 214 receives the relevant hypothesis objects and selects a single hypothesis object from the hypothesis objects. In one embodiment, the hypothesis resolver 214 invokes a simple selection process. Alternatively, the hypothesis resolver 214 can invoke a fusion process on the various hypothesis objects in order to generate a hybrid hypothesis object.

Since the architecture of the cognitive processor is asynchronous, if a computational method implemented as a hypothesis object takes longer to complete, then the hypothesis resolver 214 and downstream decider modules 216 receive the hypothesis object from that specific hypothesizer module at an earliest available time through a subscription-push process. Time stamps associated with a hypothesis object informs the downstream modules of the relevant time frame for the hypothesis object, allowing for synchronization with hypothesis objects and/or state data from other modules. The time span for which the prediction of the hypothesis object applies is thus aligned temporally across modules.

For example, when a decider module 216 receives a hypothesis object, the decider module 216 compares the time stamp of the hypothesis object with a time stamp for most recent data (i.e., speed, location, heading, etc.) of the autonomous vehicle 10. If the time stamp of the hypothesis object is considered too old (e.g., pre-dates the autonomous vehicle data by a selected time criterion) the hypothesis object can be disregarded until an updated hypothesis object is received. Updates based on most recent information are also performed by the trajectory planner 220.

The decider module(s) 216 includes modules that produces various candidate decisions in the form of trajectories and behaviors for the autonomous vehicle 10. The decider module(s) 216 receives a hypothesis for each agent 50 from the hypothesis resolver 214 and uses these hypotheses and a nominal goal trajectory for the autonomous vehicle 10 as constraints. The decider module(s) 216 can include a plurality of decider modules, with each of the plurality of decider modules using a different method or technique for determining a possible trajectory or behavior for the autonomous vehicle 10. Each decider module can operate asynchronously and receives various input states from working memory 212, such as the hypothesis produced by the hypothesis resolver 214. The decider module(s) 216 are modular components and can be added or removed from the cognitive processor 32 as desired. Each decider module 216 can update its decisions at its own update rate (e.g., rate d-Hz).

Similar to a hypothesizer module 212, a decider module 216 includes a decider class for predicting an autonomous vehicle trajectory and/or behavior. The decider class includes specifications for decider objects and a set of algorithms. Once called, a decider object is created for an agent 50 from the decider class. The decider object adheres to the specifications of the decider class and uses the algorithm of the decider class. A plurality of decider objects can be run in parallel with each other.

The decision resolver 218 receives the various decisions generated by the one or more decider modules and produces a single trajectory and behavior object for the autonomous vehicle 10. The decision resolver can also receive various contextual information from evaluator modules 232, wherein the contextual information is used in order to produce the trajectory and behavior object.

The trajectory planner 220 receives the trajectory and behavior objects from the decision resolver 218 along with the state of the autonomous vehicle 10. The trajectory planner 220 then generates a trajectory message that is provided to the trajectory sender 222. The trajectory sender 222 provides the trajectory message to the autonomous vehicle 10 for implementation at the autonomous vehicle 10, using a format suitable for communication with the autonomous vehicle 10.

The trajectory sender 222 also sends the trajectory message to virtual controller 224. The virtual controller 224 provides data in a feed-forward loop for the cognitive processor 32. The trajectory sent to the hypothesizer module(s) 212 in subsequent calculations are refined by the virtual controller 224 to simulate a set of future states of the autonomous vehicle 10 that result from attempting to follow the trajectory. These future states are used by the hypothesizer module(s) 212 to perform feed-forward predictions.

Various aspects of the cognitive processor 32 provide feedback loops. A first feedback loop is provided by the virtual controller 224. The virtual controller 224 simulates an operation of the autonomous vehicle 10 based on the provided trajectory and determines or predicts future states taken by each agent 50 in response to the trajectory taken by the autonomous vehicle 10. These future states of the agents can be provided to the hypothesizer modules as part of the first feedback loop.

A second feedback loop occurs because various modules will use historical information in their computations in order to learn and update parameters. Hypothesizer module(s) 212, for example, can implement their own buffers in order to store historical state data, whether the state data is from an observation or from a prediction (e.g., from the virtual controller 224). For example, in a hypothesizer module 212 that employs a kinematic regression tree, historical observation data for each agent is stored for several seconds and used in the computation for state predictions.

The hypothesis resolver 214 also has feedback in its design as it also utilizes historical information for computations. In this case, historical information about observations is used to compute prediction errors in time and to adapt hypothesis resolution parameters using the prediction errors. A sliding window can be used to select the historical information that is used for computing prediction errors and for learning hypothesis resolution parameters. For short term learning, the sliding window governs the update rate of the parameters of the hypothesis resolver 214. Over larger time scales, the prediction errors can be aggregated during a selected episode (such as a left turn episode) and used to update parameters after the episode.

The decision resolver 218 also uses historical information for feedback computations. Historical information about the performance of the autonomous vehicle trajectories is used to compute optimal decisions and to adapt decision resolution parameters accordingly. This learning can occur at the decision resolver 218 at multiple time scales. In a shortest time scale, information about performance is continuously computed using evaluator modules 232 and fed back to the decision resolver 218. For instance, an algorithm can be used to provide information on the performance of a trajectory provided by a decider module based on multiple metrics as well as other contextual information. This contextual information can be used as a reward signal in reinforcement learning processes for operating the decision resolver 218 over various time scales. Feedback can be asynchronous to the decision resolver 218, and the decision resolver 218 can adapt upon receiving the feedback.

Figure 3:
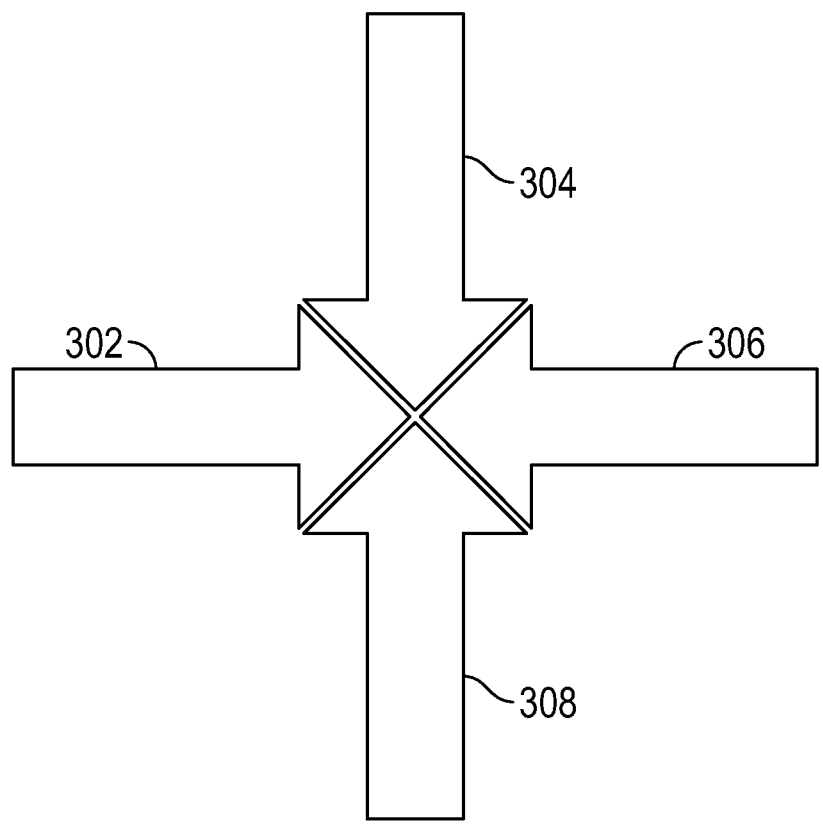
FIG. 3 is a schematic diagram illustrating several hypotheses-producing methods suitable for arriving at a prediction for use with a navigation system of the autonomous vehicle.

FIG. 3 is a schematic diagram 300 illustrating several hypotheses-producing methods suitable for arriving at a prediction for use with a navigation system of the autonomous vehicle 10. Each arrow represents a method of producing a hypothesis. Arrow 302 represents using physics-based or kinematic calculations to predict a motion of an agent, such as agent 50. Arrow 304 represents using a data-drive statistical predictor (HMM) to predict the motion of the agent 50. The statistical predictor can apply various statistical models, such as Markov models, to predict agent motion. Arrow 306 represents using a pattern-based predictor or episodic predictive method to predict motion of the agent 50. Arrow 308 represents a predicted method using a reasoning engine. The methods provided by arrow 308 provide a knowledge-based reasoning in order to complement the methods represented by arrows 302, 304 and 306.

Figure 4:
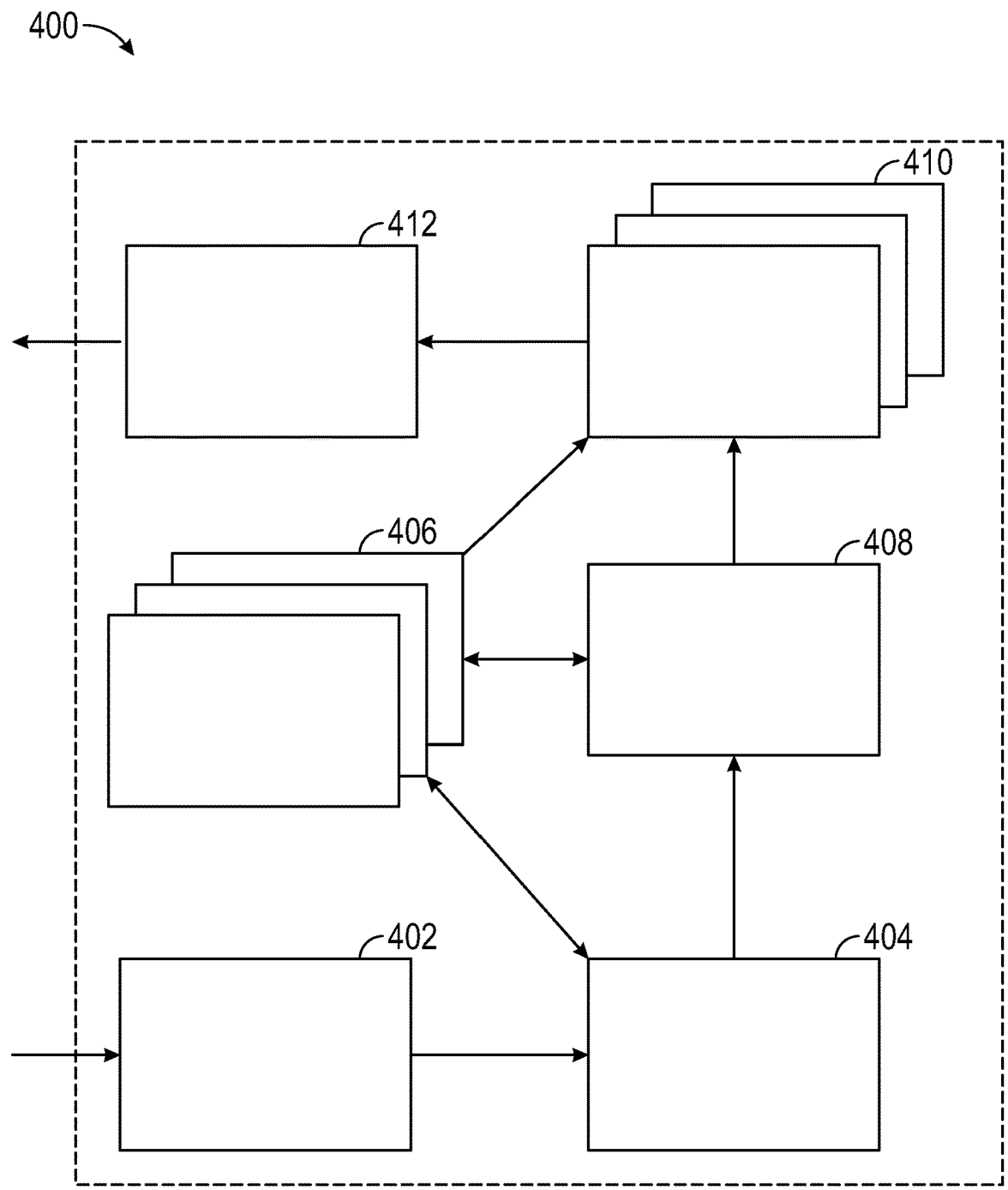
FIG. 4 shows a schematic diagram of an architecture of a cognitive processor that employs a reasoning module.

FIG. 4 shows a schematic diagram of an architecture of a cognitive processor 400 that employs a reasoning module. The cognitive processor 400 includes an interface module 402, a working memory 404, one or more hypothesizers 406, a reasoning module 408, one or more deciders 410 and a Decision Resolver and Trajectory Planner 412.

The interface module 402 receives data from the autonomous vehicle 10, such as kinematic data, etc. The working memory 404 stores this received data as well as various intermediate calculations of the one or more hypothesizers 406. The one or more hypothesizers 406 can include, but is not limited to, a kinematic hypothesizer for predicting agent motion using physical equations, a statistical hypothesizer that predicts agent motion based on statistical rules applied to received data, and an episodic hypothesizer that produces a hypothesis based on spatiotemporal data and using episodic memory (i.e., historical discretized scenarios). The one or more deciders 410 receives the hypotheses for the agents from the one or more hypothesizers 406 and determines one or more possible trajectories for the autonomous vehicle based on the hypotheses. The one or more possible trajectories for the autonomous vehicle are provided to the Decision Resolver and Trajectory Planner 412 which selects a trajectory for the autonomous vehicle and provides the trajectory to the autonomous vehicle for implementation.

The cognitive processor 400 further includes a reasoning module 408 for applying various additional predictive capabilities to the hypotheses. The one or more hypothesizers 406 and the reasoning module 408 read information stored in the working memory 404 to make their predictions. Additionally, the reasoning module 408 accepts the predictions made by the one or more hypothesizers 406 and outputs one or more predictions to the one or more deciders 410.

Figure 5:
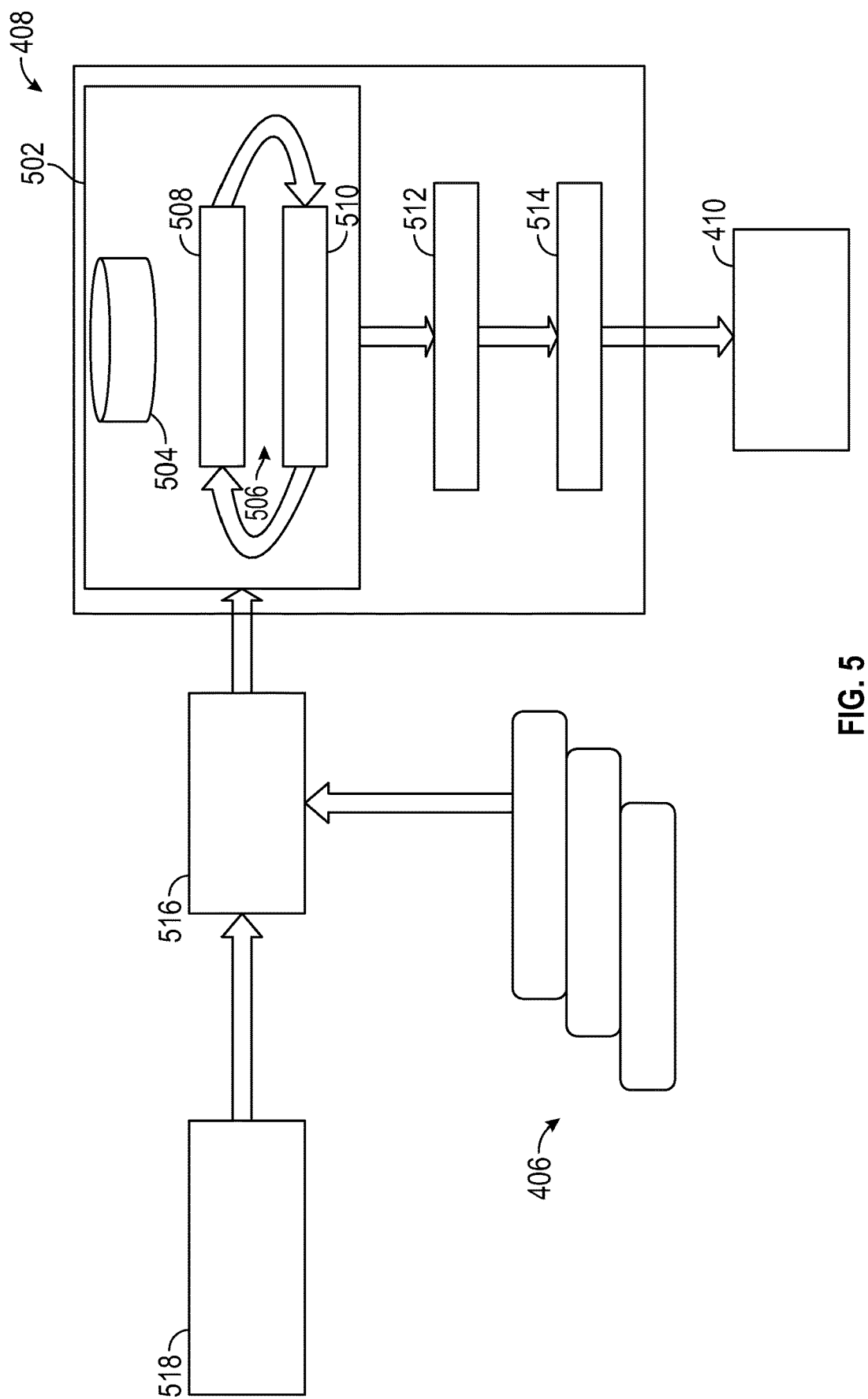
FIG. 5 shows a schematic diagram illustrating operation of the reasoning module.

FIG. 5 shows a schematic diagram illustrating operation of the reasoning module 408. The reasoning module 408 includes a reasoner 502 for generating one or more hypotheses from received data. The reasoner 502 includes a database 504 of axioms or contextual rules, such as traffic laws, situational traffic behavioral tendencies, and local speeds. The reasoning module 408 further includes a reasoning engine 506 that performs various reasoning operations to produce one or more hypotheses. The reasoning engine 506 can perform both an abductive inference reasoning 508 and a deductive inference reasoning 510 on received data.

Abductive inference reasoning refers to determining a premise of a logical statement based on its conclusion. Given a logical premise-conclusion statement of p(x)→q(x), and wherein the received data indicates a fact of q(a), the abductive inference might conclude a condition or fact of p(a). The abductive inference can determine a fact p(a) that is temporally coincident with the conclusion or that temporally precedes the fact q(a). Deductive inference reasoning refers to determining the conclusion of a logical statement based on its premise. Given the logical premise-conclusion statement of p(x)→q(x), and wherein the received data indicates a fact of p(a), the deductive inference logically arrives at the conclusion of fact q(a) based on conclusion q(x). The deductive inference can determine a fact q(a) that is temporally equivalent to the fact p(a) or that is predicted to occur after the fact p(a).

Constructive use of abductive and deductive reasoning can be used at the reasoning engine 506 to generate one or more hypotheses. In particular, both abductive and deductive reasoning can be used on a set of facts. Abductive reasoning can be used to apply logical rules backwards in order to obtain a set of conditions or facts that must have occurred in the past based on received facts in the present. These backward conditions or facts that are obtained from the abductive reasoning can then be used as premises and/or assumptions in a deductive reasoning step to obtain a forward condition, such as a prediction of a motion of an agent. The autonomous vehicle can then be operated based on the predicted forward condition derived through this backwards-forwards inference process. The backwards-forwards inference process incorporates historical conditionals into future driving predictions, thereby providing data to prepare the vehicle for future driving needs.

In one embodiment, the hypotheses are provided from the reasoning engine 506 to a hypothesis selection engine 512. The hypothesis selection engine 512 removes or revises redundant hypotheses and those hypotheses that don't fit within a given traffic scenario. A hypothesis filter 514 then reduces the number of hypotheses to those that are relevant to the current situation of the autonomous vehicle. For example, an agent that is stopped on a shoulder of a highway may not be relevant to the autonomous vehicle driving along the highway. The remaining hypotheses are provided as predictions to the one or more deciders 410.

The reasoning module 408 operates by receiving data in the form of logical terms and facts from a symbolic transformation module 516. The symbolic transformation module 516 receives time-sequence observations 518, referred to herein as tokens, from the autonomous vehicle and converts these tokens into logical terms and facts that can be used at the reasoning module 408. Additionally, hypotheses from the one or more hypothesizers 406 are provided to the symbolic transformation module 516, which similarly converts the hypotheses into logical terms and facts that can be used at the reasoning module 408.

As shown in FIG. 5, the reasoning module 408 is implemented at a single processor. In alternate embodiments, the reasoning engine can be implemented over a plurality of processor or at a cloud-based set of processors.

Figure 6:
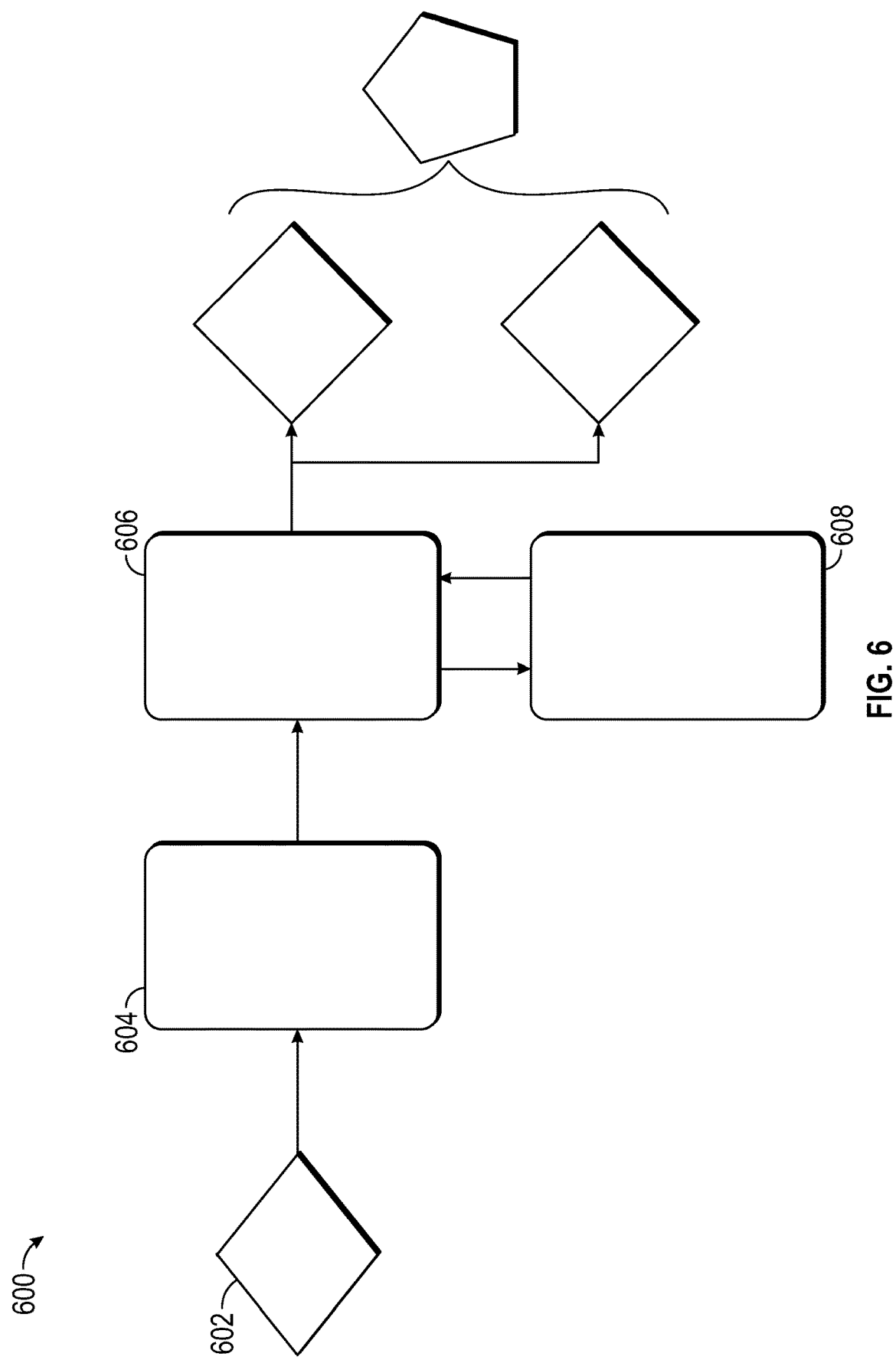
FIG. 6 shows a block diagram of a system for generating speculative scenarios based on measurements made by the various sensors of the vehicle and for evaluating the likelihood of these scenarios.

FIG. 6 shows a block diagram 600 of a system for generating speculative scenarios based on measurements made by the various sensors of the vehicle and for evaluating the likelihood of these scenarios. The system includes a measurement system 602 for obtaining measurements of an environment surrounding the vehicle 10 and a reasoning engine (symbolic reasoner 604) that generates one or more hypotheses or possible scenarios based on these measurements. The symbolic reasoner 604 includes a database 504 of axioms or contextual rules, such as traffic laws, situational traffic behavioral tendencies, and local speeds. The symbolic reasoner 604 abduces or deduces one or more scenarios by applying these contextual rules to data from the measurement system 602.

The system further includes an Inference Evaluation Engine (IEE) 606 and Episodic Memory 608. The IEE 606 determines a logic-based likelihood 610 for each of the one or more possible scenarios generated or inferred at the symbolic reasoner 604. The IEE 606 determines the logic-based likelihood 610 for the scenario by applying rules-based logic to a scenario. The IEE 606 also communicates with the Episodic Memory (EM) 608 in order to assign a historical-based likelihood 612 for each of the one or more possible scenarios. The IEE 606 outputs both the logic-based likelihood 610 and the historical-based likelihood 612. The IEE 606 can alternatively output a final likelihood 614 for each of the one or more possible scenarios. These likelihoods can be used to select a course of action or a trajectory for the vehicle suitable to the traffic situation or condition. In various embodiments, a resolver selects a candidate from the possible scenarios and sends the candidate to the navigation system or controller of the vehicle 10. The navigation system or controller generates a trajectory based on the candidate and operates or navigating the vehicle 10 using the candidate.

The EM 608 determines the historical-based likelihood by comparing the scenario to events stored in a database at the EM 608. The historical-based likelihood for a scenario is determined by quantifying a similarity between the scenario and events stored in the database. A metric is used to assign a probability to an event in the database that resembles the scenario. The metric indicates a degree to which the event resembles the scenario. The historical-based likelihood also takes account of how prevalent within the database is the event that is determined to be similar to the scenario.

Figure 7:
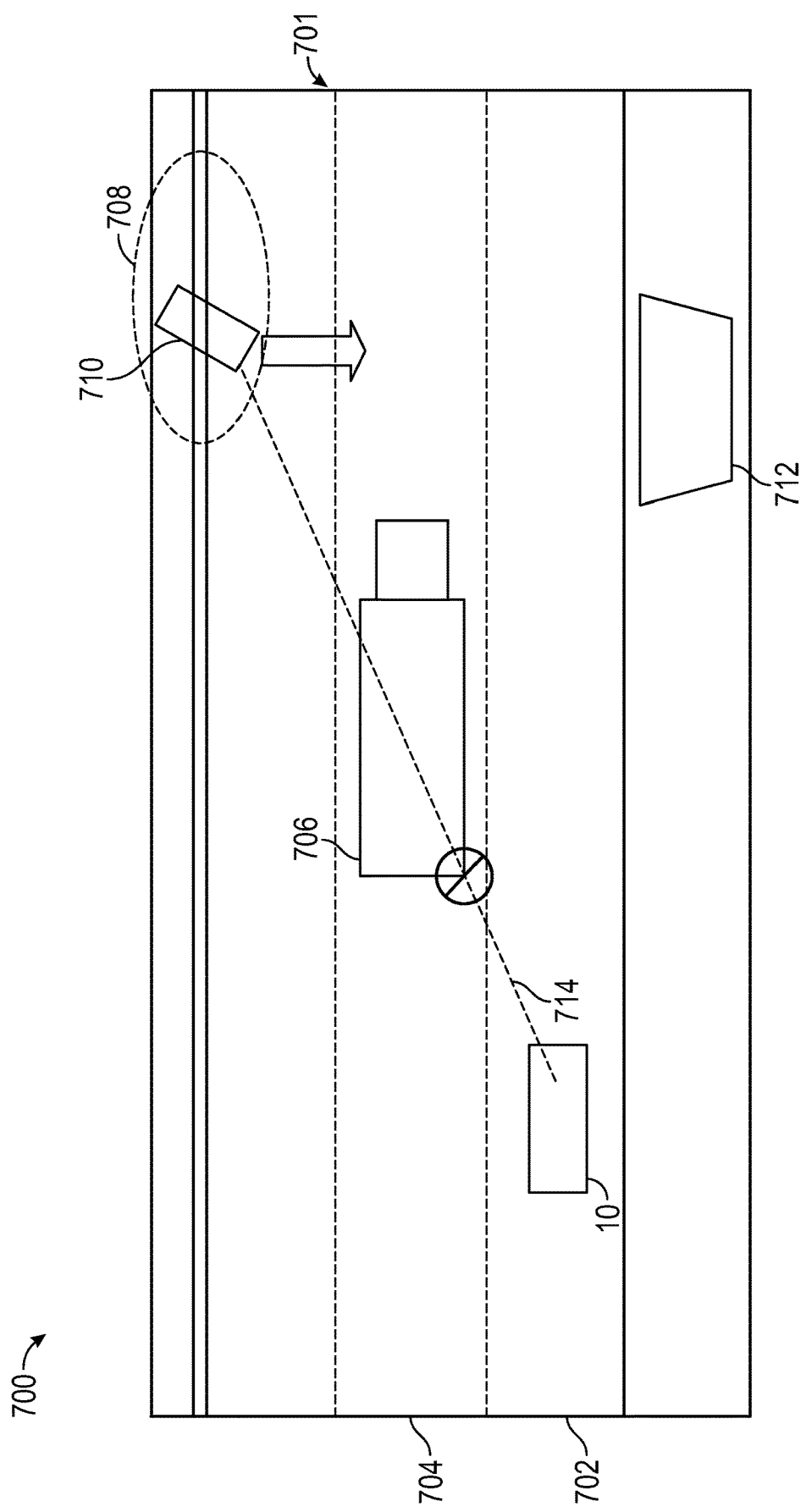
FIG. 7 shows an illustrative traffic condition in which the system of FIG. 6 can be used to evaluate possible actions or trajectories for the vehicle.

FIG. 7 shows an illustrative traffic condition 700 in which the system can be used to evaluate possible actions or trajectories for the vehicle 10. The vehicle 10 is in outside lane 702 of a street 701 and a truck 706 or other visual obstruction is ahead of the vehicle 10 and in an adjacent lane 704. The location of the truck 706 reduces a line of sight 714 of the vehicle 10 with respect to area 708. In this particular traffic condition, another vehicle 710 is or will be crossing the outside lane 702 in order to move into driveway 712. The other vehicle 710 is therefore the reason that the truck 706 is stopped. However, due to incomplete knowledge of the situation, the vehicle 10 does not know whether the other vehicle 710 is in the area 708 and therefore cannot determine how to respond to the traffic condition.

Figure 8:
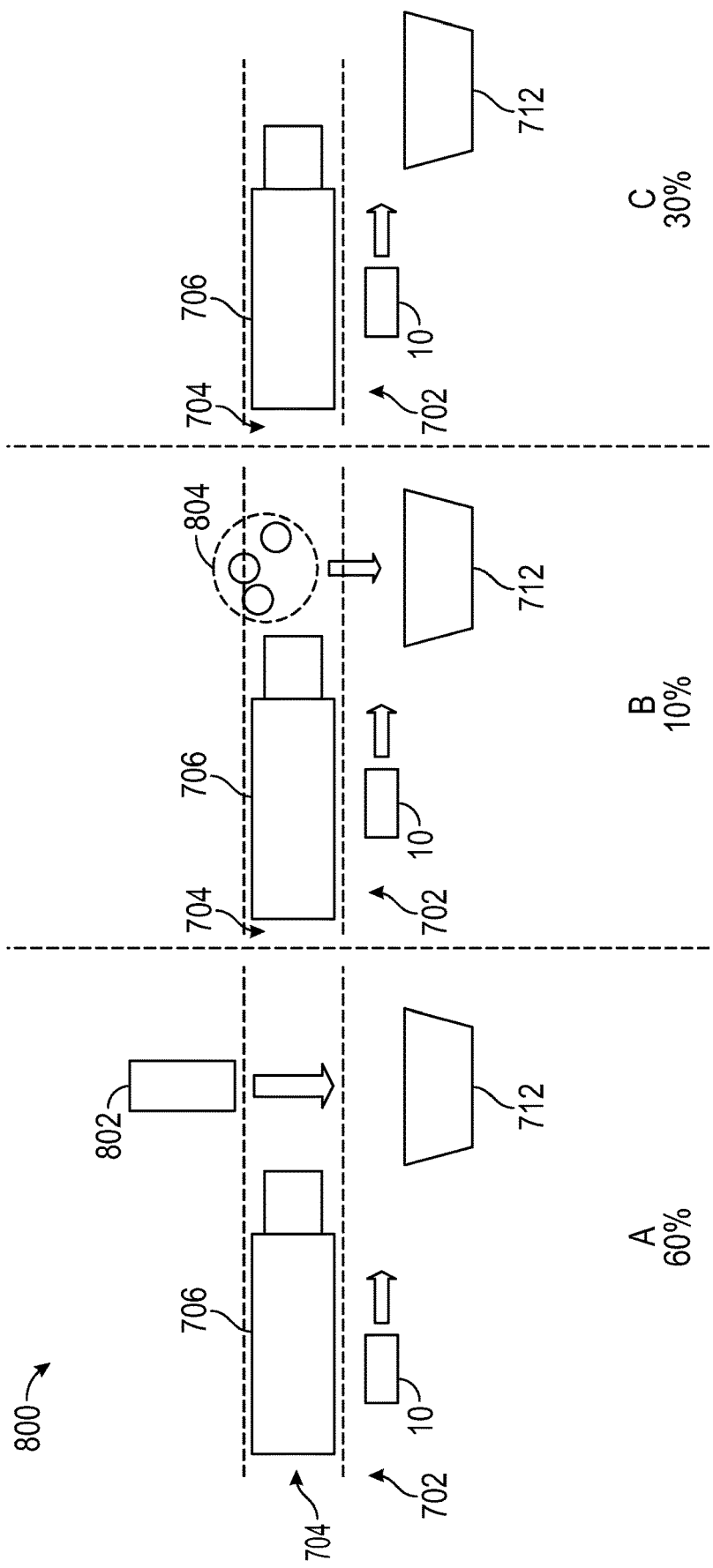
FIG. 8 shows possible scenarios that can be deduced based on the current knowledge of the traffic condition of FIG. 7.

FIG. 8 shows possible scenarios 800 that can be deduced based on the current knowledge of the traffic condition 700 of FIG. 7. A first scenario (Scenario A) predicts that a vehicle 802 will be crossing in front of the stopped truck 706 in the adjacent lane 704 by the time the vehicle 10 is about to pass the truck, thereby requiring the vehicle 10 to be ready to slow down or stop completely. A second scenario (Scenario B) predicts that one or more pedestrians 804 will be crossing in front of the stopped truck 706 in the adjacent lane 704 by the time the vehicle 10 is about to pass the truck, thereby also requiring the vehicle 10 to be ready to slow down or stop completely. A third scenario (Scenario C) predicts an unobstructed path in the outside lane 702 when the vehicle 10 passes the stopped truck 706 in the adjacent lane 704 given the current speed of the vehicle 10. These scenarios are speculative scenarios in which any one of them can be true or representative of the actual scenario. The scenarios are generated by the symbolic reasoner 604 and sent to the IEE 606 for determining a likelihood for the scenarios.

Each element in the environment is considered when assigning a logic-based probability or various rules or principles likelihood to a scenario using various rules or principles. For the illustrative traffic conditions of FIG. 8, some rules are as follows: 1) vehicles tend toward being in motion unless an obstruction or traffic rule demands it, 2) driveways tend to attract vehicles occasionally, and 3) driveways do not have a specific tendency to attract pedestrians. The rules are applied to elements or landmarks in the environment to generate scenarios. Some landmarks for the illustrative traffic condition include the presence of the driveway 712, the presence of lane markings, the lack of crosswalk markings, the presence of stopped vehicles. Using these illustrative rules and the illustrative landmarks, the IEE 606 may assign a higher logic-based likelihood to Scenario A that to either of Scenario B or Scenario C. For illustrative purposes only, the logic-based likelihood for Scenario A is 60%, the logic-based likelihood for Scenario B is 10% and the logic-based likelihood for Scenario C is 30%.

Figure 9:
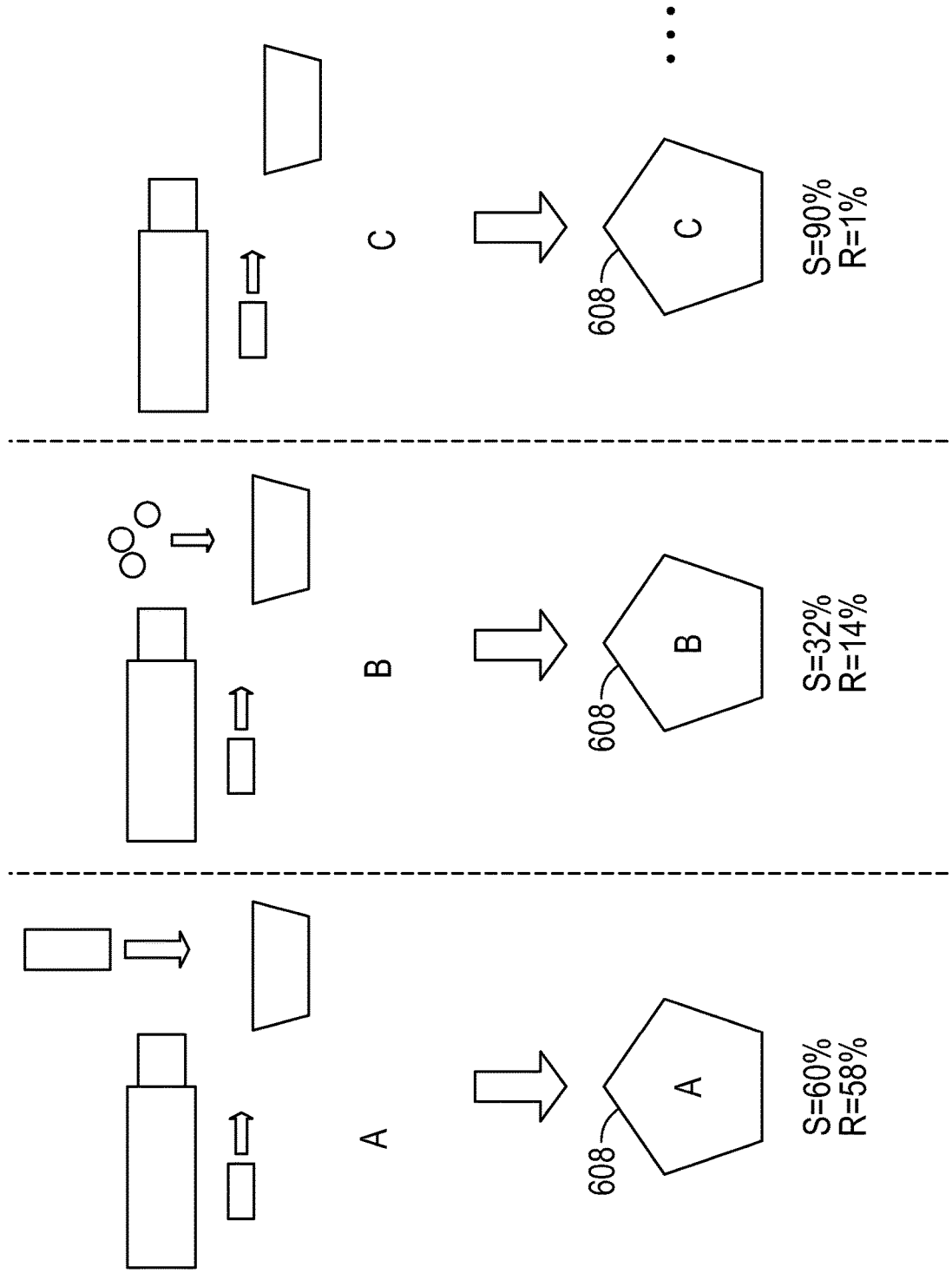
FIG. 9 shows a diagram illustrating historical-based likelihoods for the various scenarios shown in FIG. 8.

FIG. 9 shows a diagram illustrating historical-based likelihoods for the various scenarios shown in FIG. 8. The historical-based likelihood is determined at the EM 608. After determining the logic-based likelihood, the IEE 606 tokenizes each of the scenarios and sends the tokenized scenarios to the EM 608. A tokenized scenario is an archetypical example of the scenario in a token format.

The EM 606 compares the tokenized scenario to one or more events stored in the database of the EM 608 and determines a similarity percentage (S) based on the comparison. The similarity percentage indicates a similarity between the tokenized scenario and an event. The EM 608 then determines how common the similar event is in the database or how often the event occurs in the database, thereby determining an occurrence score shown as a representative percentage (R). Scenario A shows a 60% similarity with a particular event in the database and the event is representative of 58% of the events in the database. Scenario B shows a 32% similarity with an event in the database and the event is representative of 14% of the events in the database. Scenario C shows a 90% similarity with an event that is representative of 1% of the events in the database.

The historical-based likelihood for a scenario is sent from the EM 608 to the IEE 606. The IEE 606 outputs both the logic-based likelihood and the historical-based likelihood. The IEE 606 can also output a final likelihood based on both the logic-based likelihood and the historical-based likelihood. A course of action than be chosen for the vehicle based on any of the likelihoods output by the IEE 606.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating an autonomous vehicle, comprising:
    inferring a plurality of possible scenarios based on a current state of an environment of the autonomous vehicle;
    tokenizing each of the plurality of possible scenarios;
    determining a historical likelihood for each of the plurality of possible scenarios using each of the tokenized scenarios, wherein the historical likelihood for a tokenized scenario is based on a similarity percentage indicating a similarity of the tokenized scenario to one or more historical events in a database and an occurrence score indicating how often the one or more historical events in the database having a similarity to the tokenized scenario occurs in the database;
    selecting a scenario from the plurality of possible scenarios using the historical likelihoods; and
    operating the autonomous vehicle based on the selected scenario.

2. The method of claim 1, further comprising determining a logic-based likelihood for each of the plurality of possible scenarios, and selecting the scenario from the plurality of possible scenarios based on the historical likelihoods and the logic-based likelihoods.

3. The method of claim 1, further comprising determining a similarity percentage for the tokenized scenario based on a similarity metric between the tokenized scenario and the one or more historical events.

4. The method of claim 1, further comprising inferring the plurality of possible scenarios based on incomplete or ambiguous measurements.

5. The method of claim 1, wherein inferring the plurality of possible scenarios further comprises applying one of abduction, deduction and a combination of abduction and deduction to data indicative of the current state of the environment.

6. A system for operating an autonomous vehicle, comprising:
a processor configured to:
operate a reasoning engine configured to infer a plurality of possible scenarios based on a current state of an environment of the autonomous vehicle;
operate an inference evaluation engine to tokenize each of the plurality of possible scenarios;
operate an episodic memory to determine a historical likelihood for each of the plurality of possible scenarios using each of the tokenized scenarios, wherein the historical likelihood for a tokenized scenario is based on a similarity percentage indicating a similarity of the tokenized scenario to one or more historical events in a database and an occurrence score indicating how often the one or more historical events in the database having a similarity to the tokenized scenario occurs in the database;
operate a resolver to select a scenario from the plurality of possible scenarios using the historical likelihoods; and
control the autonomous vehicle based on the selected scenario.

7. The system of claim 6, wherein the processor is further configured to operate the Inference Evaluation Engine to determine a logic-based likelihood for each of the plurality of possible scenarios and to select the scenario from the plurality of possible scenarios based on the historical likelihoods and the logic-based likelihoods.

8. The system of claim 6, wherein the processor is further configured to operate the episodic memory to determine the similarity percentage for the tokenized scenario based on a similarity metric between the tokenized scenario and the one or more historical events.

9. The system of claim 6, wherein the processor is further configured to operate the reasoning engine to infer the plurality of possible scenarios based on incomplete or ambiguous measurements.

10. The system of claim 6, wherein the processor is further configured to operate the reasoning engine to infer a possible scenario by applying one of abduction, deduction and a combination of abduction and deduction to data indicative of the current state of the environment.

11. An autonomous vehicle, comprising:
a processor configured to:
operate a reasoning engine to infer a plurality of possible scenarios based on a current state of an environment of the autonomous vehicle;
operate an inference evaluation engine to tokenize each of the plurality of possible scenarios;
operate an episodic memory to determine a historical likelihood for each of the plurality of possible scenarios using each of the tokenized scenarios, wherein the historical likelihood for a tokenized scenario is based on a similarity percentage indicating a similarity of the tokenized scenario to one or more historical events in a database and an occurrence score indicating how often the one or more historical events in the database having a similarity to the tokenized scenario occurs in the database;
operate a resolver to select a scenario from the plurality of possible scenarios using the historical likelihoods; and
control the autonomous vehicle based on the selected scenario.

12. The autonomous vehicle of claim 11, wherein the processor is further configured to operate the Inference Evaluation Engine to determine a logic-based likelihood for each of the plurality of possible scenarios and to select the scenario from the plurality of possible scenarios based on the historical likelihoods and the logic-based likelihoods.

13. The autonomous vehicle of claim 11, wherein the processor is further configured to operate the episodic memory the similarity percentage for the tokenized scenario based on a similarity metric between the tokenized scenario and the one or more historical events.

14. The autonomous vehicle of claim 11, wherein the processor is further configured to operate the reasoning engine to infer a possible scenario by applying one of abduction, deduction and a combination of abduction and deduction to data indicative of the current state of the environment.

* * * * *